(12) United States Patent
Dasgupta et al.

(10) Patent No.: US 10,671,747 B2
(45) Date of Patent: Jun. 2, 2020

(54) MULTI-USER PERMISSION STRATEGY TO ACCESS SENSITIVE INFORMATION

(71) Applicants: Dipankar Dasgupta, Germantown, TN (US); Arunava Roy, Memphis, TN (US); Debasis Ghosh, Memphis, TN (US)

(72) Inventors: Dipankar Dasgupta, Germantown, TN (US); Arunava Roy, Memphis, TN (US); Debasis Ghosh, Memphis, TN (US)

(*) Notice: Subject to any disclaimer, the term of this patent is extended or adjusted under 35 U.S.C. 154(b) by 0 days.

(21) Appl. No.: 15/932,439

(22) Filed: Apr. 10, 2017

(65) Prior Publication Data
US 2019/0130124 A1    May 2, 2019

Related U.S. Application Data

(63) Continuation-in-part of application No. 14/968,676, filed on Dec. 14, 2015, now Pat. No. 9,912,657.

(60) Provisional application No. 62/169,991, filed on Jun. 2, 2015, provisional application No. 62/262,626, filed on Dec. 3, 2015.

(51) Int. Cl.
*H04L 29/06* (2006.01)
*G06F 21/62* (2013.01)
*G06F 21/40* (2013.01)

(52) U.S. Cl.
CPC .......... *G06F 21/6218* (2013.01); *G06F 21/40* (2013.01); *H04L 63/0876* (2013.01); *H04L 63/105* (2013.01); *G06F 2221/2113* (2013.01); *H04L 63/101* (2013.01)

(58) Field of Classification Search
CPC . H04L 63/08; H04L 63/0831; H04L 63/0861; H04L 63/105; G06F 21/6218; G06F 21/31; G06F 21/32; G06F 21/40; G06F 21/44; G06F 21/45
USPC .............................. 726/2–7, 27–30; 713/168
See application file for complete search history.

(56) References Cited

U.S. PATENT DOCUMENTS

| | | | |
|---|---|---|---|
| 7,484,245 B1* | 1/2009 | Friedman | G06F 21/52 380/283 |
| 7,526,792 B2* | 4/2009 | Ross | H04L 63/0263 713/154 |
| 7,788,489 B2* | 8/2010 | Ng | G06F 21/6227 713/165 |

(Continued)

OTHER PUBLICATIONS

PCT International Search Report and Written Opinion, PCT/US18/026782, Dasgupta et al., filed Apr. 10, 2017.

*Primary Examiner* — Hosuk Song
(74) *Attorney, Agent, or Firm* — Wayne Edward Ramage; Baker Donelson

(57) ABSTRACT

A system and related methods for providing greater security and control over access to classified files and documents and other forms of sensitive information based upon a multi-user, multi-modality permission strategy centering on organizational structure, thereby making authentication strategy unpredictable so to significantly reduce the risk of exploitation. Based on the sensitivity or classification of the information being requested by a user, approvers are selected dynamically based on the work environment, e.g., mobility, use of the computing device seeking access, authentication factors under applicable environmental settings, access policy, and the like.

11 Claims, 1 Drawing Sheet

(56) References Cited

U.S. PATENT DOCUMENTS

| | | | |
|---|---|---|---|
| 8,160,548 B2* | 4/2012 | Aaron | G07C 9/00309 |
| | | | 455/411 |
| 8,327,457 B1* | 12/2012 | Ferrara | G06F 21/604 |
| | | | 399/366 |
| 2002/0062240 A1 | 5/2002 | Morinville | |
| 2005/0125674 A1* | 6/2005 | Nishiki | G07C 9/00031 |
| | | | 713/182 |
| 2012/0137360 A1 | 5/2012 | Henderson | |
| 2016/0277374 A1 | 9/2016 | Reid | |

* cited by examiner

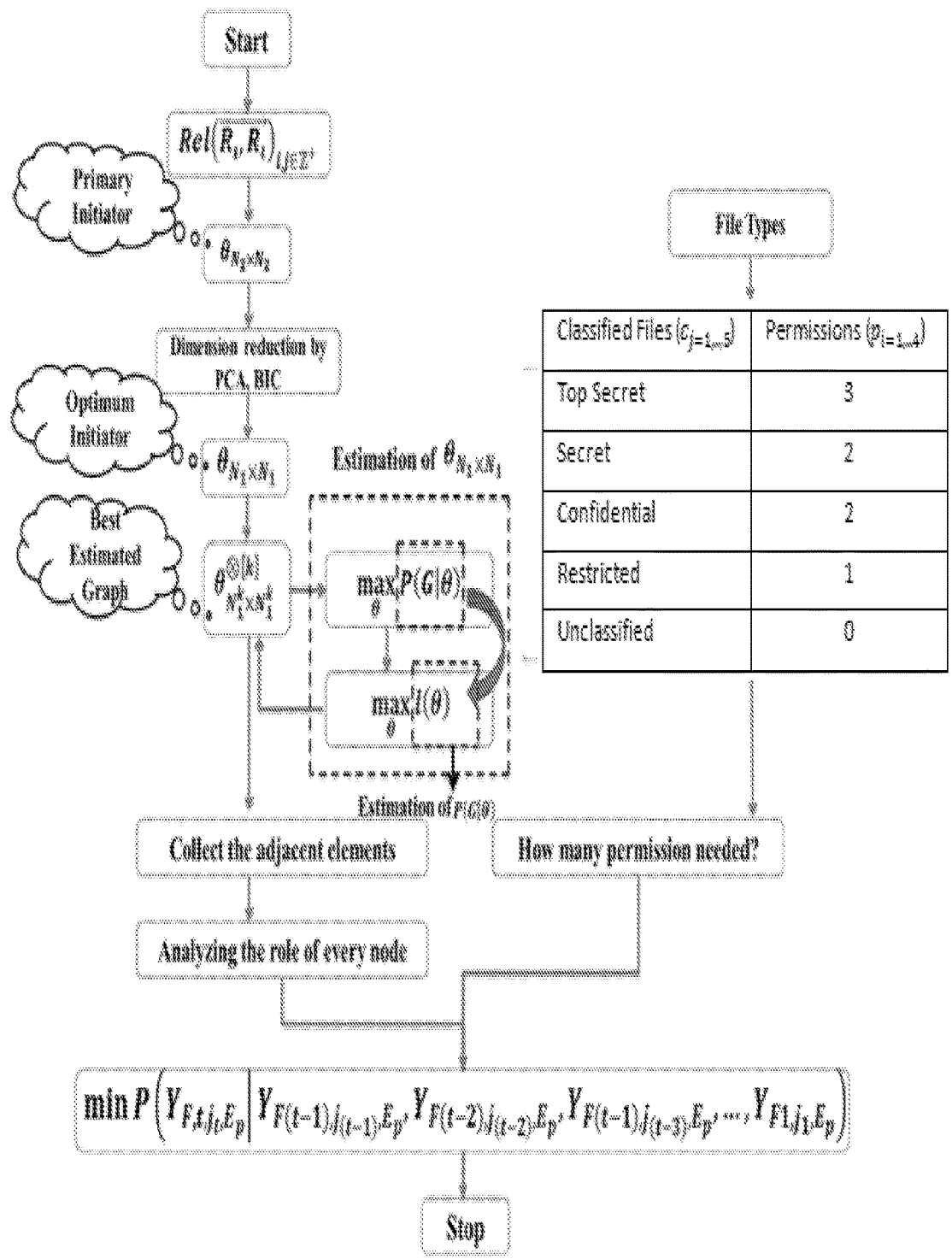

MULTI-USER PERMISSION STRATEGY TO ACCESS SENSITIVE INFORMATION

This application claims priority as a continuation-in-part application of U.S. patent application Ser. No. 14/968,676, filed Dec. 14, 2015, which claims benefit of and priority to U.S. Provisional Application No. 62/169,991, filed Jun. 2, 2015, and U.S. Provisional Application No. 62/262,626, filed Dec. 4, 2015, by Dipankar Dasgupta, et al.

FIELD OF INVENTION

This invention relates to a system and method for controlling computer-based access to classified or protected files and documents, or other sensitive information.

BACKGROUND OF THE INVENTION

Exfiltration of sensitive data and intellectual property theft have increased to a significant level affecting both government agencies as well as small to large businesses. One of the major sources of data breaches is malicious insiders who have the access rights, knowledge of data values and technical know-how to escalate their privileges in launching such insider attacks. Traditional access control policies (to shared data and computing resources) have been framed according to the trust on legitimate users' access rights (e.g., read, write and execute) based on their jobs and role hierarchy in an organization. However, such access privileges are increasingly being misused by hostile, oblivious, rogue and pseudo-insiders. Accordingly, what is needed is a system providing greater security and control over access to classified files and documents and other forms of sensitive information.

BRIEF DESCRIPTION OF THE DRAWINGS

FIG. 1 shows a view of a system in accordance with an embodiment of the present invention.

DETAILED DESCRIPTION OF EXEMPLARY EMBODIMENTS

In various exemplary embodiments, the present inventions comprises a system and related methods for providing greater security and control over access to classified files and documents and other forms of sensitive information based upon a multi-user permission strategy centering on organizational structure. Based on the sensitivity or classification of the information being requested by a user, approvers are selected dynamically based on the work environment (e.g., mobility, use of the computing device seeking access, access policy, and the like).

The present invention first generates an access control graph for a subject organization, based on the interrelationship among employees and their roles in an organization. It then generates a set of permission grantees, who are allowed to approve the access request of a particular user at a given time. As seen in FIG. 1, the system does this by finding a set of possible approvers for a user file access request based on potential approvers rank, availability, and other pertaining conditions. In several embodiments, the system incorporates the Key Result Area (KRA) of the employee. The number of separate permissions needed for approval may be based on the classification (secrecy) level. The system then determines in real time or near real time the set of permission approvers for the request. Selection of the set of approvers is non-repetitive, thereby reducing the change of manipulation of the permission approvers.

In several embodiments, the present system assumes that the organizational structure as a graph or network that depends on the inter-relationship of components. Each organization has a specific hierarchical employee structure, with corresponding roles and task assignments. Each employee has a role (or, in some case, multiple roles), and each role encompasses or requires different activities. The workflow in the organization is bi-directional, in order to optimize productivity and reduce wastage of human efforts. Organization files and documents are classified into different categories, and are archived. As discussed above, access to a particular file or document needs a specific number of approvals, based on the level of sensitivity.

The system thus mitigates privilege abuse risks by establishing a protocol of shared-responsibility among a group of users (e.g., employees in an organization). any request for accessing a classified or protected file or document needs approval from a set of approvers, rather than seeking approval from a single approver. The person requesting access does not know the set of approvers selected for a particular access request, and cannot determine their identities. Access and approver logs may be kept with proper retention for audit and risk analysis, such as when an incident is reported, as described below.

The present invention is applicable for various forms of organizations, enterprises, and governmental agencies.

In several embodiments, the present invention comprises a method of accessing classified documents from an active archived system, in response to a user access request for classified data, information, or services. The system develops a multi-approver strategy to provide shared-trustworthiness access to the classified data, information and services. User access logs and approver logs are stored at a separate (which may be geographically separate) location under different control (thereby preventing a rogue "superuser" from accessing or erasing the log files to remove traces of malicious activities). These logs may be analyzed and a risk analysis performed when an unexpected or anomalous incident occurs. With high-bandwidth communication media and user-friendly applications on mobile computing devices, approvers will be able to grant or deny access requests in near real-time, so the delay in receiving access permission is bounded or limited.

Malicious or anomalous behavior provides feedback to the system for intelligently deciding the approvers for an particular user's access request, thereby forming a closed-loop data-breach prevention and detection framework.

The system design thus separates policy from the mechanisms of access control and execution of tasks. Today's organizations rely on either (one) uniform policy for all document access or on separate access policies for documents without other considerations such as human factors, organizational structure and work flow (tasks and activities), and non-technical attacks such as social-engineering or collusion. By separating all these facets and creating enforcement mechanisms, the shared-trust framework of the present invention provides the necessary flexibility for an organization yet gives the organization the control of setting the access policies for classified/sensitive documents while minimizing the effect of factors mentioned. The present system thus addresses issues such as, but not limited to, automatic enforcement of security policy, on-technical threats (e.g., social engineering and collusion). When a user requests access to a particular classified document, the response will be based on the shared trust policy from a set of users from the organization (based on the organization structure and role of the user) who are available at that instance of time to act as approvers notifying them to approve the request.

These embodiments, as well as other exemplary embodiments, as well as the tools and programs referenced above, are described in detail in the attached materials which are attached hereto and incorporated herein in their entirety (including all text and figures therein) by reference:

"Multi-User Permission Strategy to Access Sensitive Information" (29 pages)

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

What is claimed is:

1. A machine for improved secure access to computing devices, systems, resources, or services, comprising:
   one or more computer servers with access control data for a subject organization; and
   a processor or microprocessor, wherein the processor or microprocessor is programmed to determine a response to an access authentication request by:
   generating an access control graph for the subject organization, said access control graph based on the inter-relationships among a plurality of employees and their roles in the subject organization;
   receiving an access request from a user to access one or more secured computing devices, computing systems, computer resources, or computer services;
   generating a set of possible approvers for the access request from the user, wherein the set of possible approvers is based on each possible approvers' current availability and rank in the subject organization with respect to the user;
   generating a set of permission approvers from the set of possible approvers; and
   obtaining approval from each of the set of permission grantees prior to providing access to the user in response to the access request.

2. The machine of claim 1, wherein the set of permission approvers differs for each access request from the user.

3. The machine of claim 1, wherein the user does not know the set of permission approvers associated with a particular user access request.

4. The machine of claim 1, wherein the set of possible approvers is based on the key result area (KRA) of the user.

5. The machine of claim 1, wherein the access request is communicated from a mobile device of the user.

6. The machine of claim 1, further comprising the step of determining the number of separate approvals required for access to said one or more secured computing devices, computing systems, computer resources, or computer services.

7. The machine of claim 6, wherein the size of the set of permission approvers is based on the number of separate approvals required.

8. The machine of claim 6, wherein the number of separate approvals required is based on a sensitivity or classification level of the one or more secured computing devices, computing systems, computer resources, or computer services.

9. The machine of claim 1, further comprising the step of storing the access request and approvals in a user access log and an approver log corresponding to each approver in the set of permission approvers.

10. The machine of claim 9, wherein the user access log and the approver logs are stored in a geographically separate location from the one or more computer servers.

11. The machine of claim 1, wherein the set of permission approvers is determined in real time.

* * * * *